(12) United States Patent
Davantes et al.

(10) Patent No.: US 9,404,241 B1
(45) Date of Patent: Aug. 2, 2016

(54) WASTE WATER DIVERTER APPARATUS

(71) Applicants: Roland Joseph Davantes, San Rafael, CA (US); Anthony Leonard Fabiano, San Rafael, CA (US)

(72) Inventors: Roland Joseph Davantes, San Rafael, CA (US); Anthony Leonard Fabiano, San Rafael, CA (US)

( * ) Notice: Subject to any disclaimer, the term of this patent is extended or adjusted under 35 U.S.C. 154(b) by 66 days.

(21) Appl. No.: 14/465,342

(22) Filed: Aug. 21, 2014

Related U.S. Application Data

(60) Provisional application No. 61/871,740, filed on Aug. 29, 2013.

(51) Int. Cl.
*F16K 27/12* (2006.01)
*E03B 1/04* (2006.01)
*F16K 11/085* (2006.01)

(52) U.S. Cl.
CPC ............. *E03B 1/044* (2013.01); *F16K 11/0853* (2013.01); *F16K 27/12* (2013.01)

(58) Field of Classification Search
USPC ..................................... 137/925.47; 251/287
See application file for complete search history.

(56) References Cited

U.S. PATENT DOCUMENTS

| | | | |
|---|---|---|---|
| 925,053 A | 6/1909 | Sturgis | |
| 1,549,969 A * | 8/1925 | Grindle | F16K 11/0833 137/625.42 |
| 3,473,550 A * | 10/1969 | Gadsden, Jr. | F16K 11/0853 137/268 |
| 3,826,539 A * | 7/1974 | Kunz | B65G 53/56 137/625.47 |
| 3,935,108 A * | 1/1976 | Forgues | B01D 35/00 137/599.14 |
| 4,044,789 A * | 8/1977 | Elmore | F16K 11/0833 137/367 |
| 4,112,972 A | 9/1978 | Lajeuness | |
| 4,173,234 A * | 11/1979 | Thomas | F16K 11/0873 137/625.47 |
| 4,264,244 A * | 4/1981 | Steele | B65G 53/56 137/874 |
| 4,286,625 A * | 9/1981 | Tomlin | F16K 5/16 137/493.8 |
| 4,365,366 A * | 12/1982 | Ortega | F16K 11/085 137/625.25 |
| 4,398,562 A * | 8/1983 | Saarem | F16K 31/041 126/585 |
| 4,509,719 A * | 4/1985 | Uomala | F16K 27/12 137/315.28 |
| 4,702,269 A * | 10/1987 | Schuler | F16K 11/0853 137/246.12 |
| 5,423,343 A * | 6/1995 | Crouch | E03F 3/00 137/15.17 |
| 8,127,793 B2 * | 3/2012 | Ito | F16K 11/0853 137/625.47 |
| 2006/0096648 A1 | 5/2006 | Guerrier | |

* cited by examiner

*Primary Examiner* — John Fox
(74) *Attorney, Agent, or Firm* — Plager Schack LLP

(57) ABSTRACT

A waste water diverter apparatus enables an undisturbed flow of fluid and solids in the waste water through the apparatus. The waste water diverter apparatus includes a substantially Y-shaped valve housing with an inlet port, a first outlet port and a second outlet port, and an inner valve member having a circular aperture and rotatably mounted to the Y-shaped housing. The circular aperture has an angled pathway that extends through the inner valve member. The inner valve member adjusts to a first position to enable the aperture to connect the inlet port to the first outlet port and a second position to enable the aperture to connect the inlet port to the second outlet port.

7 Claims, 5 Drawing Sheets

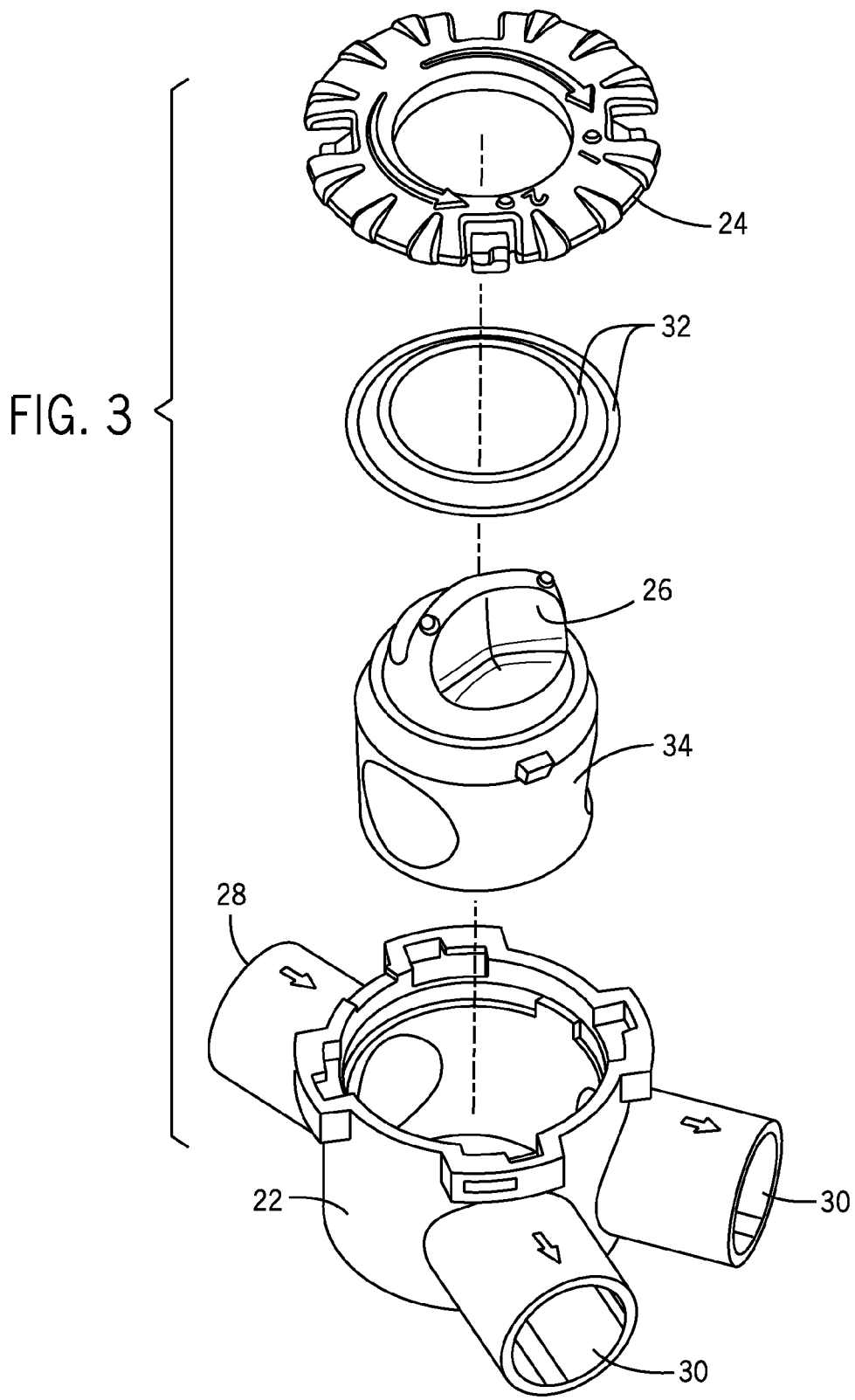

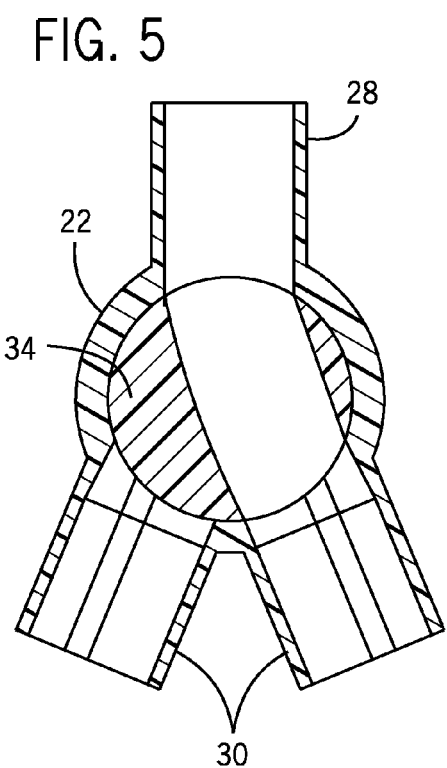
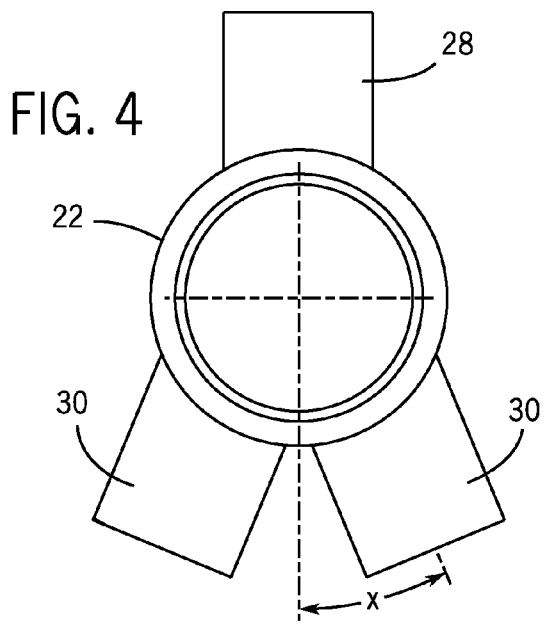
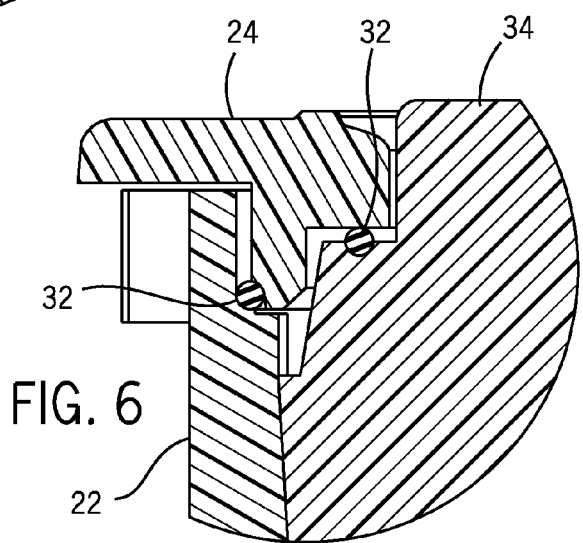

WASTE WATER DIVERTER APPARATUS

RELATED APPLICATION

The application claims priority to provisional patent application U.S. Ser. No. 61/871,740 filed on Aug. 29, 2013, the entire contents of which is herein incorporated by reference.

BACKGROUND

The embodiments herein relate generally to water diversion valves used in plumbing systems.

As fresh water resources become scarce and water demands continue to increase around the world, alternative water sources that previously were considered unusable are being captured for reuse. These potential new sources of supply include rainwater, gray water and black water. Rainwater generally refers to waste water deposited on roof tops by way of roof drains or roof leaders. Gray water generally refers to waste water generated from household uses such as remaining water from bathing and washing clothes. Black water refers to heavily contaminated water originating from waste sources such as toilets. As interest grows for capturing rainwater, gray water and black water for treatment and/or reuse, there is a corresponding need for plumbing systems to effectively divert these types of waste water to multiple pipes.

Several fluid diversion devices exist as disclosed in U.S. Pat. No. 4,112,972 and 925,053, and U.S. Patent Application Publication 2006/0096648. These devices include pivotably mounted flaps that connect an inlet pipe to one of two outlet pipes. However, these devices are disadvantageous because the flat-surfaced flaps reduce the cross-sectional flow area at the junction of the inlet pipe and outlet pipe. This disturbs and/or partially blocks the flow of waste water, which may include both liquids and solids.

As such, there is a need in the industry for a waste water diverter apparatus that overcomes the limitations of the prior art.

SUMMARY

A waste water diverter apparatus configured to enable an undisturbed flow of fluid and solids in the waste water through the apparatus is provided. The waste water diverter apparatus comprises a substantially Y-shaped valve housing comprising an inlet port, a first outlet port and a second outlet port, and an inner valve member comprising a circular aperture and rotatably mounted to the Y-shaped housing, wherein the circular aperture comprises an angled pathway that extends through the inner valve member, wherein the inner valve member is configured to adjust to a first position to enable the aperture to connect the inlet port to the first outlet port and a second position to enable the aperture to connect the inlet port to the second outlet port.

BRIEF DESCRIPTION OF THE FIGURES

The detailed description of some embodiments of the invention will be made below with reference to the accompanying figures, wherein the figures disclose one or more embodiments of the present invention.

FIG. 3 depicts an exploded perspective view of certain embodiments of the waste water diverter apparatus;

FIG. 4 depicts a top plan view of certain embodiments of the waste water diverter apparatus;

FIG. 5 depicts a cross-sectional view of certain embodiments of the waste water diverter apparatus taken along line 5-5 in FIG. 2;

FIG. 6 depicts a cross-sectional view of certain embodiments of the waste water diverter apparatus showing the O-ring seals;

DETAILED DESCRIPTION OF CERTAIN EMBODIMENTS

Figure 1:
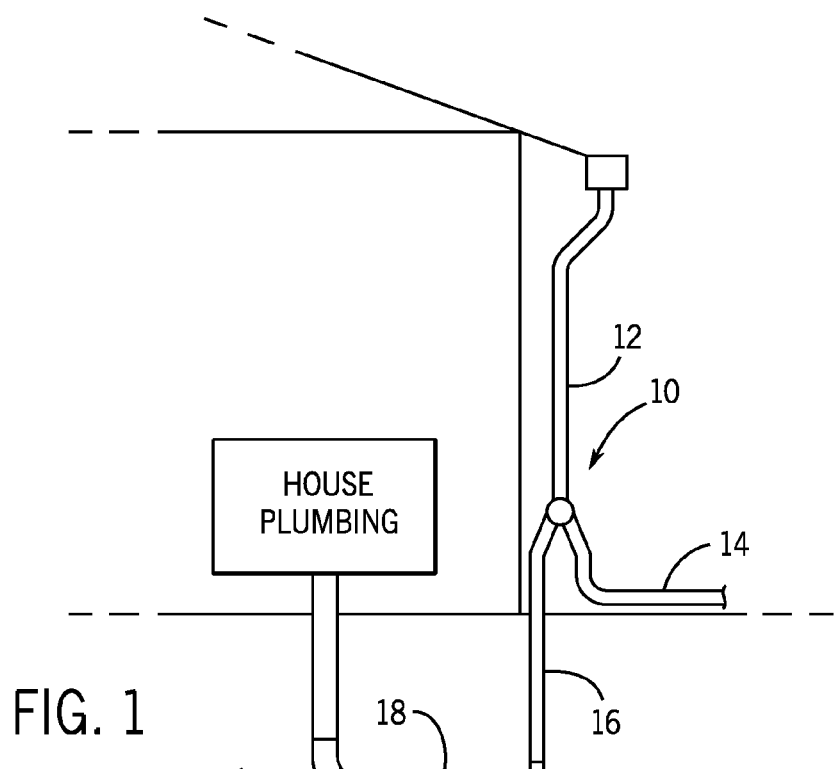
FIG. 1 depicts a schematic view of certain embodiments of the waste water diverter apparatus in use.

As depicted in FIG. 1, waste water diverter apparatus 10 is configured for use with any plumbing system for a building such as a house. Waste water diverter apparatuses 10 may be used with any variety of pipes to transport waste water such as rainwater, black water or gray water, which may include both fluids and/or solids. In an exemplary configuration, waste water diverter apparatuses are connected to downspout 12, rainwater pipe 14, drain pipe 16, black water pipe 18, sewer pipe 20 and alternate pipe 21.

Figure 2:
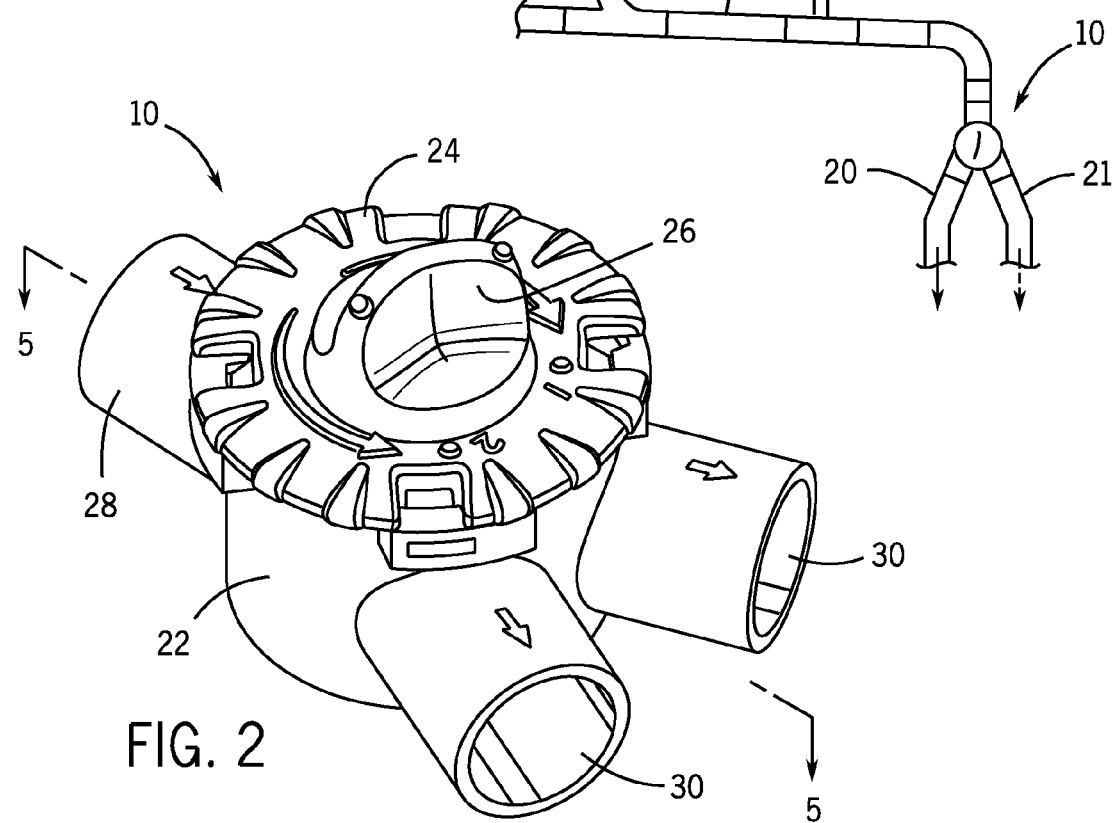
FIG. 2 depicts a perspective view of certain embodiments of the waste water diverter apparatus.

As depicted in FIGS. 2-3, waste water diverter apparatus 10 comprises valve housing 22, inner valve member 34, knob 26 and cover 24. Valve housing 22 comprises inlet port 28, and a pair of outlet ports 30. Inlet port 28 and outlet ports 30 are oriented to form a true Y-shaped housing. As depicted in FIG. 4, inlet port 28 and outlet ports 30 are offset by angle X. In a preferred embodiment, angle X is 22.5 degrees. However, angle X may also be 45 degrees, 60 degrees, or any alternative numbered degrees. Inlet port 28 and outlet ports 30 are circular tubular members configured to connect with any circular pipes known in the field. Valve housing 22 further comprises an opening on the top configured to receive inner valve member 34. Knob 26 is affixed to the top of inner valve member 34. In an alternative embodiment, knob 26 may be integrated into inner valve member 34 as a single component.

In one embodiment, inner valve member 34 comprises a cylindrical shape with a circular aperture disposed throughout the member at an angle. Inner valve member 34 comprises a pair of nubs affixed to the side walls, which slidably engage and disengage with corresponding openings disposed within valve housing 22. As a result, inner valve member 34 is rotatably mounted to valve housing 22. A first O-ring 32 is disposed on valve housing 22 and a second O-ring 32 is disposed on inner valve member 34 prior to being covered by cover 24. In a preferred embodiment, O-rings 32 are made from rubber.

Cover 24 is a ring that is secured to valve housing 22 by press fit components. For example, cover 24 comprises four tabs that are configured to slidably engage and disengage with corresponding openings on valve housing 22. It shall be appreciated that any alternative number of tabs on cover 24 and openings on valve housing 22 may be used instead. Once cover 24 is locked, inner valve member 34 is secured in place with knob 26 extending through the central opening of cover 24. In a preferred embodiment, cover 24, knob 26, inner valve member 34 and valve housing 22 are made from plastic such as polyvinyl chloride (PVC) or acrylonitrile butadiene styrene (ABS). However, alternative materials known in the field may be used including, but not limited to, brass, copper, and other metals or alloys.

To operate waste water diverter apparatus 10, a user manually rotates knob 26 by hand to adjust the circular aperture of inner valve member 34 so that the circular aperture connects inlet port 28 with one of the two outlet ports 30. Once the circular aperture is properly aligned with inlet port 28 and one of the two outlet ports 30, the nubs of inner valve member 34 slidably engage with a corresponding pair of openings disposed within valve housing 22. The user can rotate knob 26 as needed to connect inlet port 28 with either outlet port 30 of valve housing 22. As depicted in FIG. 5, the circular aperture comprises an angled pathway with a smooth and continuous inner wall that extends through inner valve member 34. The circular aperture diameter is substantially equal to the diameter of inlet port 28 and the diameters of outlet ports 30. This allows fluid and solid waste to flow through waste water diverter apparatus 10 undisturbed. This is because the flow area of the circular aperture matches the flow area of inlet port 28 and outlet ports 30. O-rings 32 provide a seal and prevent waste water from leaking out of waste water diverter apparatus 10. As depicted in FIG. 6, a first O-ring 32 is disposed between cover 24 and valve housing 22 and a second O-ring 32 is disposed between cover 24 and inner valve member 34.

Figure 7:
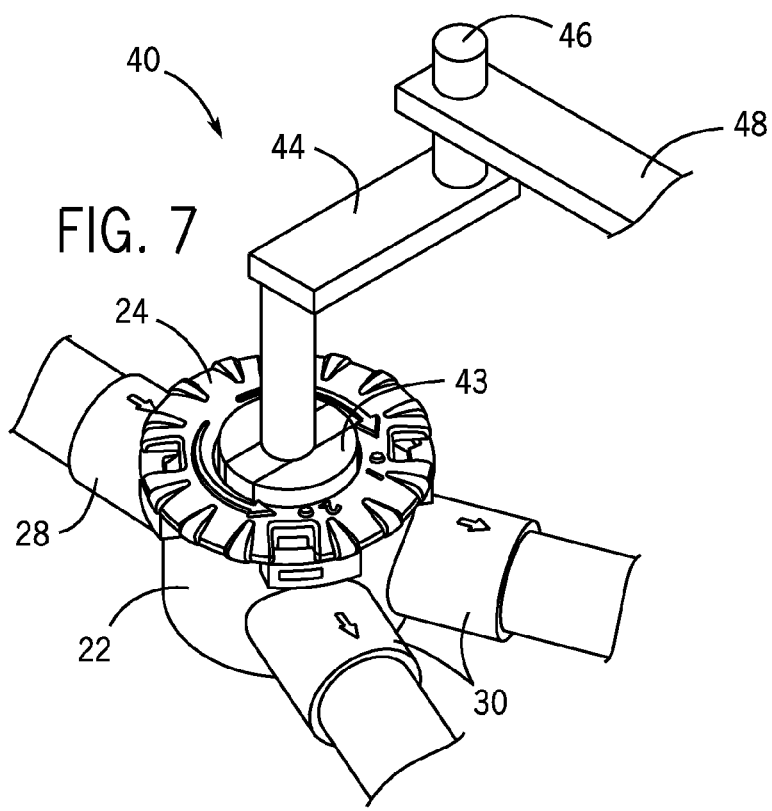
FIG. 7 depicts a perspective view of an alternative embodiment of the waste water diverter apparatus.
Figure 8:
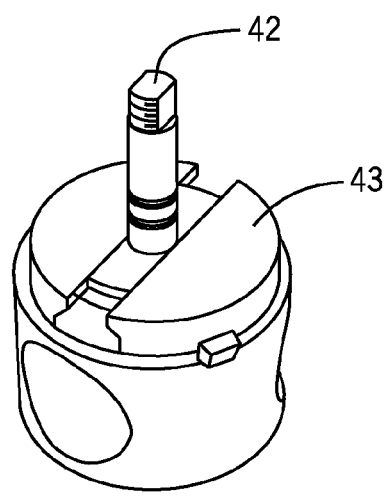
FIG. 8 depicts a perspective view of the alternative embodiment of the waste water diverter apparatus showing the inner cylindrical valve member.
Figure 9:
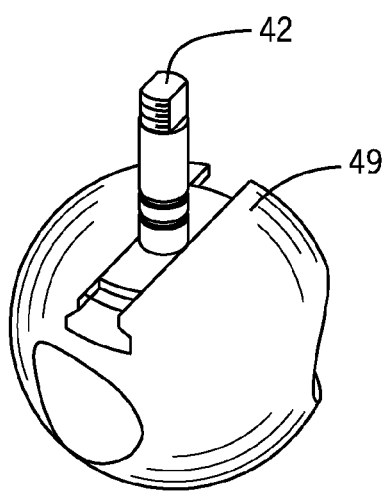
FIG. 9 depicts a perspective view of the alternative embodiment of the waste water diverter apparatus showing the inner spherical valve member.

As depicted in FIGS. 7-8, an alternative embodiment 40 is disclosed, which comprises waste water diverter apparatus 10 configured to be operated automatically by a solenoid attachment or motor system (not shown). In this embodiment, waste water diverter apparatus 10 comprises valve housing 22, inlet port 28, output ports 30 and cover 24, which are the same as discussed above. Stem 42 is integrated into the top of inner cylindrical valve member 43 as a single component. However, stem 42 may also be affixed to cylindrical valve member 43 as a separate component. Once inner cylindrical valve member 43 is rotatably mounted to valve housing 22, stem 43 is operably connected to a solenoid attachment via arm 44, pin 46 and solenoid rod 48. Alternatively, stem 42 can be directly connected to a solenoid or motor system. The solenoid or motor system automatically adjusts waste water diverter apparatus 10 as desired such that the circular aperture of inner cylindrical valve member 43 connects inlet port 28 with one of the two outlet ports 30. As depicted in FIG. 9, alternative shaped inner valve members may be used such as inner spherical valve member 49.

Figure 10:
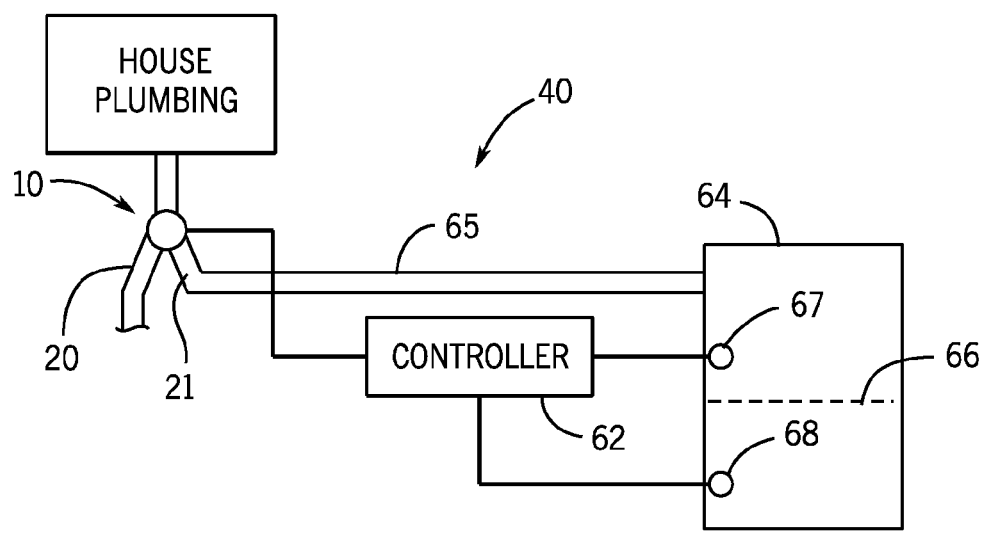
FIG. 10 depicts a schematic view of the alternative embodiment of the waste water diverter apparatus.

FIG. 10 depicts a schematic view of alternative embodiment 40 in use, which comprises waste water diverter apparatus 10, sewer pipe 20, alternate pipe 21, controller 62, tank 64, high water sensor 67 and low water sensor 68. Alternate pipe 21 is connected to tank 64 via connecting pipe 65. Controller 62 comprises any computer processors or electrical components known in the field, and is operably connected to waste water diverter apparatus 10, high water sensor 67 and low water sensor 68 via wires. High water sensor 67 and low water sensor 68 are mounted within tank 64.

Once water level 66 reaches low water sensor 68, low water sensor 68 transmits signals to controller 62, which are forwarded to waste water diverter apparatus 10. The solenoid or motor system then automatically adjusts inner cylindrical valve member 43 such that waste water is diverted to tank 64 via alternate pipe 21 and connecting pipe 65. Once water level 66 reaches high water sensor 67, high water sensor 67 transmits signals to controller 62, which are forwarded to waste water diverter apparatus 10. The solenoid or motor system then automatically adjusts inner cylindrical valve member 43 such that waste water is diverted to sewer pipe 20 instead.

Once water level 66 drops below high water sensor 67, controller 62 may be configured to enable waste water diverter apparatus 10 to automatically divert waste water back to tank 64 until water level 66 reaches high water sensor 67. It shall be appreciated that controller 62 may be programmed in any way to enable waste water diverter apparatus 10 to function as desired.

It shall be appreciated that the components of waste water diverter apparatus 10 described in several embodiments herein may comprise any alternative known materials in the field and be of any color, size and/or dimensions. It shall be appreciated that the components of waste water diverter apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A waste water diverter apparatus configured to enable an undisturbed flow of fluid and solids in the waste water through the apparatus, the waste water diverter apparatus comprising:
   a substantially Y-shaped valve housing comprising an inlet port, a first outlet port, a second outlet port, and a central cavity positioned between the first inlet port and outlet ports, the central cavity comprising a plurality of openings disposed throughout a side wall of the cavity, each opening of the plurality of openings being generally equidistant from other adjacent openings in the plurality of openings; and
   an inner valve member comprising a circular aperture and rotatably mounted to the Y-shaped housing, the circular aperture comprising an angled pathway that extends through the inner valve member, the inner valve member configured to adjust to a first position to enable the aperture to connect the inlet port to the first outlet port and a second position to enable the aperture to connect the inlet port to the second outlet port;
   a knob coupled to the inner valve member; and
   a ring member detachably coupled to the valve housing and comprising a central opening configured to permit the knob to extend therethrough, the ring member comprising a plurality of tabs coupled to an outer edge of the ring member, each tab of the plurality of tabs configured to slidably engage or disengage with one of the plurality of openings in the valve housing.

2. The waste water diverter apparatus of claim 1, wherein the inlet port, first outlet port and second outlet port comprise circular tubular members and the inner valve member circular aperture comprises a diameter substantially equal to the diameter of the inlet port, the diameter of the first outlet port, and the diameter of the second outlet port.

3. The waste water diverter apparatus of claim 2, further comprising a pair of nubs affixed to the inner valve member, wherein each nub of the pair of nubs is configured to slidably engage with any one of the plurality of openings in the central cavity of the valve housing.

4. The waste waster diverter apparatus of claim 2, further comprising a stem affixed to a top portion of the inner valve member, wherein the stem is configured to operably connect to a solenoid system.

5. The waste water diverter apparatus of claim 1, further comprising a first O-ring disposed between the ring cover and the valve housing and a second O-ring disposed between the ring cover and the inner valve member, wherein the first and second O-rings are configured to prevent waste water from leaking out of the apparatus.

6. The waste water diverter apparatus of claim 5, wherein the inner valve member comprises a spherical shape.

7. The waste water diverter apparatus of claim 5, wherein the inner valve member comprises a cylindrical shape.

\* \* \* \* \*